UNITED STATES PATENT OFFICE.

HERMANN LEICHSENRING, OF CHICAGO, ILLINOIS.

ARTIFICIAL PLASTER.

SPECIFICATION forming part of Letters Patent No. 433,899, dated August 5, 1890.

Application filed February 5, 1890. Serial No. 339,353. (No specimens.)

*To all whom it may concern:*

Be it known that I, HERMANN LEICHSENRING, having resided for over two years in this country and made oath to become a citizen of the United States, and having post-office address at 785 Racine avenue, in the city of Chicago, in the county of Cook and State of Illinois, have invented a new and useful Composition of Matter to be used as Artificial Plaster, of which the following is a specification.

Heretofore a composition of plaster-of-paris, glue, and water has been used as a wall-covering composition, but after extensive use of this composition, embracing a number of years, I have found it objectionable, because the glue shrinks when it becomes dry and the covering becomes full of holes or rents.

My composition consists of the following ingredients, in substantially the proportions specified, to wit: one (1) part of glycolline, six (6) parts of water, and plaster-of-paris in sufficient quantity to make the mass or composition plastic or to reduce it to a "stiff pap."

In preparing my compound for use I simply mix the ingredients by mechanical appliances and make the composition plastic, so it can be applied by ordinary tools. If it is desired to color the composition or to imitate marble or other stones, a suitable coloring-matter is added to the composition and mixed in with it.

The composition is applied to the surface or wall while it is in a plastic condition, and the glycolline serves to retard the setting or hardening of such plastic composition for a sufficient length of time after the ingredients are compounded, so that said composition can be applied by the workman to better advantage.

The new ingredient of my wall-covering composition is glycolline, a chemical substance obtained from boiled glue and a small proportion of lime, and in addition to serving as a retarder for the plastic composition I have found that this new ingredient (glycolline) possesses in the composition the following important advantages: It makes the composition much harder, more firm and dense, and the surface of the composition can be highly polished.

To impart a color to the composition, or to imitate marble or other stones, I add a liquid coloring-matter or paint to the plaster-of-paris, glycolline, and water in suitable proportions to attain the desired imitation of marble.

No claim is herein made to glycolline, *per se*, as the same forms the subject-matter of a separate application; but the present application is restricted to the ingredients forming the wall-covering composition.

Having thus fully described my invention, what I claim is—

1. The herein-described wall-covering composition, consisting of glycolline, plaster-of-paris, and water, substantially as described.

2. The herein-described composition of matter for wall-covering or artificial marble, consisting of glycolline, plaster-of-paris, water, and coloring-matter, substantially as described.

HERM. LEICHSENRING.

Witnesses:
 ANDREW SOEHNYEN,
 MILES KEHOE.